(12) United States Patent
Geissenhoener et al.

(10) Patent No.: US 10,352,078 B2
(45) Date of Patent: Jul. 16, 2019

(54) MECHANISM AND METHOD FOR ACTUATING A CHARGING FLAP

(71) Applicant: Dr. Ing. h.c. F. Porsche Aktiengesellschaft, Stuttgart (DE)

(72) Inventors: Kai Geissenhoener, Suhl (DE); Detlev Ranft, Ettlingen (DE)

(73) Assignee: Dr. Ing. h.c.F Porsch Aktiengesellschaft (DE)

( * ) Notice: Subject to any disclaimer, the term of this patent is extended or adjusted under 35 U.S.C. 154(b) by 275 days.

(21) Appl. No.: 15/480,672

(22) Filed: Apr. 6, 2017

(65) Prior Publication Data

US 2017/0292305 A1   Oct. 12, 2017

(30) Foreign Application Priority Data

Apr. 12, 2016  (DE) .................. 10 2016 106 651

(51) Int. Cl.
| | |
|---|---|
| *B62D 25/00* | (2006.01) |
| *E05F 1/10* | (2006.01) |
| *B62D 25/24* | (2006.01) |
| *F16H 21/44* | (2006.01) |
| *B60K 15/05* | (2006.01) |

(52) U.S. Cl.
CPC ............... *E05F 1/10* (2013.01); *B60K 15/05* (2013.01); *B62D 25/24* (2013.01); *F16H 21/44* (2013.01); *B60K 2015/053* (2013.01); *B60K 2015/0561* (2013.01); *E05Y 2201/47* (2013.01); *E05Y 2201/686* (2013.01); *E05Y 2900/53* (2013.01)

(58) Field of Classification Search
CPC ...... B60L 53/16; Y02T 10/7005; Y02T 90/14; Y02T 10/7072; H02J 7/0042; B60K 15/05

USPC ..................................................... 296/100.04
See application file for complete search history.

(56) References Cited

U.S. PATENT DOCUMENTS

| | | | | |
|---|---|---|---|---|
| 2,589,026 | A | * | 3/1952 | Phillips ................... B64C 21/08 244/216 |
| 4,042,126 | A | * | 8/1977 | Blauvelt ................ B65G 59/08 271/107 |
| 4,353,517 | A | * | 10/1982 | Rudolph ................... B64C 9/20 244/216 |
| 4,580,315 | A | * | 4/1986 | Beckwith .............. E05F 1/1238 16/289 |

(Continued)

FOREIGN PATENT DOCUMENTS

| | | |
|---|---|---|
| DE | 4438610 | 5/1996 |
| DE | 19729856 | 1/1999 |

(Continued)

OTHER PUBLICATIONS

German Search Report dated Dec. 8, 2016.

*Primary Examiner* — Kiran B Patel
(74) *Attorney, Agent, or Firm* — Gerald E. Hespos; Michael J. Porco; Matthew T. Hespos

(57) ABSTRACT

An electric vehicle (1) has a charging flap (10) articulated on a support structure by way of a four-bar linkage arrangement (14) so that the charging flap (10) can be moved between a closed position (FIG. 3A) and an open position (FIG. 3F). To simplify the actuation of the charging flap, the mechanism for actuating the charging flap (10) has a push-push element (20) combined with a spring device (15) that is assigned to the four-bar linkage arrangement (14).

6 Claims, 7 Drawing Sheets

(56) References Cited

U.S. PATENT DOCUMENTS

| | | | | |
|---|---|---|---|---|
| 4,587,760 | A * | 5/1986 | Brissette | E05D 3/18 16/288 |
| 5,921,613 | A * | 7/1999 | Breunig | B60J 5/06 296/146.12 |
| 6,618,904 | B1 * | 9/2003 | Nagy | E05D 3/145 16/288 |
| 8,321,996 | B2 | 12/2012 | Hirtsiefer | |
| 9,415,696 | B2 | 8/2016 | Pickartz et al. | |
| 10,245,943 | B2 * | 4/2019 | Mori | B60K 15/04 |
| 2005/0173943 | A1 * | 8/2005 | Duffy | E05D 3/16 296/146.12 |
| 2006/0202534 | A1 * | 9/2006 | Heidmann | A47C 7/405 297/354.1 |
| 2011/0025087 | A1 * | 2/2011 | Ramos | B60K 15/05 296/97.22 |
| 2011/0140477 | A1 * | 6/2011 | Mihai | B60K 15/05 296/97.22 |
| 2011/0285165 | A1 * | 11/2011 | Baba | E05F 5/022 296/97.22 |
| 2011/0285166 | A1 * | 11/2011 | Baba | E05D 3/145 296/97.22 |
| 2012/0019206 | A1 * | 1/2012 | Sekido | B60L 11/1877 320/109 |
| 2012/0153661 | A1 * | 6/2012 | Woodworth | B60K 15/05 296/97.22 |
| 2013/0152474 | A1 * | 6/2013 | Yamamaru | E05D 7/04 49/246 |
| 2013/0157485 | A1 * | 6/2013 | Yamamaru | H02G 3/14 439/147 |
| 2015/0097529 | A1 * | 4/2015 | Lacour | B60L 53/18 320/109 |
| 2015/0375630 | A1 * | 12/2015 | Jeong | B60K 15/05 49/386 |
| 2016/0016464 | A1 * | 1/2016 | Betzen | B60K 15/05 296/97.22 |
| 2016/0087375 | A1 * | 3/2016 | Yoshizawa | B60K 1/04 439/345 |
| 2016/0101686 | A1 * | 4/2016 | Brown | B60K 15/05 296/97.22 |
| 2016/0325621 | A1 * | 11/2016 | Le-Tinnier | B60K 15/04 |
| 2016/0332716 | A1 * | 11/2016 | Kammerer | B64C 1/1407 |
| 2017/0001517 | A1 * | 1/2017 | Herrmann | B60K 15/05 |
| 2018/0215254 | A1 * | 8/2018 | Jobst | B60L 53/16 |
| 2019/0093404 | A1 * | 3/2019 | Schmid | E05D 11/06 |
| 2019/0106918 | A1 * | 4/2019 | Schmid | E05D 7/125 |

FOREIGN PATENT DOCUMENTS

| | | |
|---|---|---|
| DE | 10026841 | 12/2001 |
| DE | 10048587 | 4/2002 |
| DE | 20215067 | 1/2003 |
| DE | 102010020800 | 5/2012 |
| DE | 102012022101 | 5/2013 |
| EP | 1018588 A1 | 7/2000 |
| EP | 1308375 A2 | 5/2003 |
| EP | 2392755 A2 | 12/2011 |

* cited by examiner

MECHANISM AND METHOD FOR ACTUATING A CHARGING FLAP

CROSS REFERENCE TO RELATED APPLICATION

This application claims priority under 35 USC 119 to German Patent Appl. No. 10 2016 106 651.6 filed on Apr. 12, 2016, the entire disclosure of which is incorporated herein by reference.

BACKGROUND

1. Field of the Invention

The invention relates to a mechanism and to a method for actuating a charging flap of an electric vehicle. The charging flap is articulated on a support structure by way of a four-bar linkage arrangement so that the charging flap can be moved between a closed position and an open position. The invention relates to an electric vehicle having a charging flap that can be actuated by a mechanism of this type.

2. Description of the Related Art

US 2015/0375630 discloses a four-bar linkage structure for opening a charging flap in electric vehicles.

DE 44 38 610 A1 discloses an adjustable filler flap of a motor vehicle. The filler flap has an actuating member and a pivoting lever and is fastened to be pivoted first about a stationary pivot axis and then about an axis on the flap that is approximately parallel to the pivot axis. The filler cap can be moved from a closed position that closes a wall opening into an open position that at least partially releases the wall opening over an edge region of the wall opening. The actuating member is a second pivoting lever that can be pivoted first about a stationary pivot axis and second about an axis on the flap to form a four-bar linkage with the other pivoting lever and the flap.

It is an object of the invention to simplify the actuation of a charging flap that is articulated on a support structure by way of a four-bar linkage arrangement in such a way that the charging flap can be moved between a closed position and an open position.

SUMMARY

A charging flap is articulated on a support structure by way of a four-bar linkage arrangement in such a way that the charging flap can be moved between a closed position and an open position. The mechanism for actuating the charging flap comprises a push-push element that is combined with a spring device which is assigned to the four-bar linkage arrangement. In the closed position, a charging opening of the electric vehicle is closed by the charging flap. In the open position, the charging opening of the electric vehicle is released by the charging flap so that a charging plug can be plugged into the charging opening to charge an electric energy storage device in the electric vehicle. A particularly comfortable mechanism for actuating the charging flap is provided in a simple way by the combination of the spring device with the push-push element. The push-push element may be combined with a locking device. The push-push element can be blocked with the aid of the locking device to keep the charging flap closed, for example in a parking mode or in a driving mode of the electric vehicle. As a result, undesired opening of the charging flap is prevented reliably in certain operating states, for example during parking. A locking device having a push-push mechanism for other applications, such as keeping containers closed, such as ashtrays, drawers, closable trays on a center console or glove compartment lids, is known, for example from German laid-open specification DE 10 2010 050 800 A1.

The charging flap may be prestressed into its closed position and into its open position by the spring device. As a result, manual opening and closing of the charging flap is simplified considerably. Prestressing the charging flap into its closed position advantageously reliably prevents the charging flap from remaining open in an undesired manner after the charging operation. The prestressing of the charging flap both into its closed position and into its open position is realized by a reversal of action of lever arms of the four-bar linkage arrangement with the aid of the spring device. Opening the charging flap is initiated by the push-push element. The charging flap then is opened further by hand until the charging flap finally is moved into its open position by the spring device.

The spring device may have a spring dead center that has a dead center position arranged between the opened and closed positions of the charging flap. The reversal of action of the lever arms of the four-bar linkage arrangement is realized by the spring dead center. In the dead center position, the charging flap advantageously is much closer to its closed position then to its open position. The charging flap may be opened slightly, for example approximately by a finger width, by the push-push element.

The charging flap may be pivoted up out of its closed position into its open position. The term upward relates to a vehicle Z-direction. A longitudinal direction or longitudinal axis of the electric vehicle also is called an X-direction. A transverse direction of the electric vehicle also is called a vehicle Y-direction or Y-axis. The vehicle Z-direction or Z-axis is perpendicular to a plane defined by the X-axis and the Y-axis. In its open position, the charging flap may be above the charging opening to such an extent that a fitting charging plug can be plugged into the charging opening in a simple way to charge the electric energy storage device in the vehicle with electric energy.

The charging flap that is in its open position may be above a charging opening. As a result, the charging of the electric vehicle is simplified. In the open position, the charging flap is advantageously arranged on a body region, in particular a wing region, of the electric vehicle. The charging opening with the charging flap may be arranged on a front wing of the electric vehicle.

The four-bar linkage arrangement may comprise two link pairs that are articulated on two sides of the charging flap. Each link pair of the four-bar linkage arrangement may comprise two identical links. As a result, the construction and the production of the four-bar linkage arrangement are simplified. The charging flap can be held in its open position in a particularly stable manner by the two link pairs of the four-bar linkage arrangement. As a result, undesired damage of the charging flap or the four-bar linkage arrangement is prevented when the charging flap is open, in particular during charging. The charging opening may be arranged between the two link pairs of the four-bar linkage arrangement.

A method for actuating a charging flap may be characterized in that, after pressure is exerted on the push-push element during opening, the charging flap first is opened only slightly, in particular approximately by a fingerbreadth, by way of the push-push element, before the charging flap then is opened further manually. The push-push element may be arranged behind the charging flap. A position of the push-push element behind the charging flap can be marked correspondingly on the charging flap. The push-push element may be in a corner region and/or in an edge region of the charging flap. The slight opening of the charging flap by way of the push-push element advantageously makes manual further opening of the charging flap possible. The manual further opening of the charging flap is advantageously assisted by way of the spring device.

The charging flap is moved into its open position by the spring device after the spring dead center is overcome. The complete opening of the charging flap by the combination of the spring device with the four-bar linkage then takes place automatically.

During closing, the charging flap first is closed manually until the charging flap is closed by the spring device after the spring dead center is overcome. This achieves a simple way where the charging flap automatically is closed completely.

The invention relates to an electric vehicle having a charging flap that can be actuated by way of an above-described mechanism and/or in accordance with an above-described method. The combination of the push-push element with the spring device and a four-bar linkage arrangement can achieve a particularly comfortable actuation of the charging flap in a simple way.

Further advantages, features and details of the invention result from the following description, in which various exemplary embodiments are described in detail with reference to the drawing.

DETAILED DESCRIPTION

Figure 1:
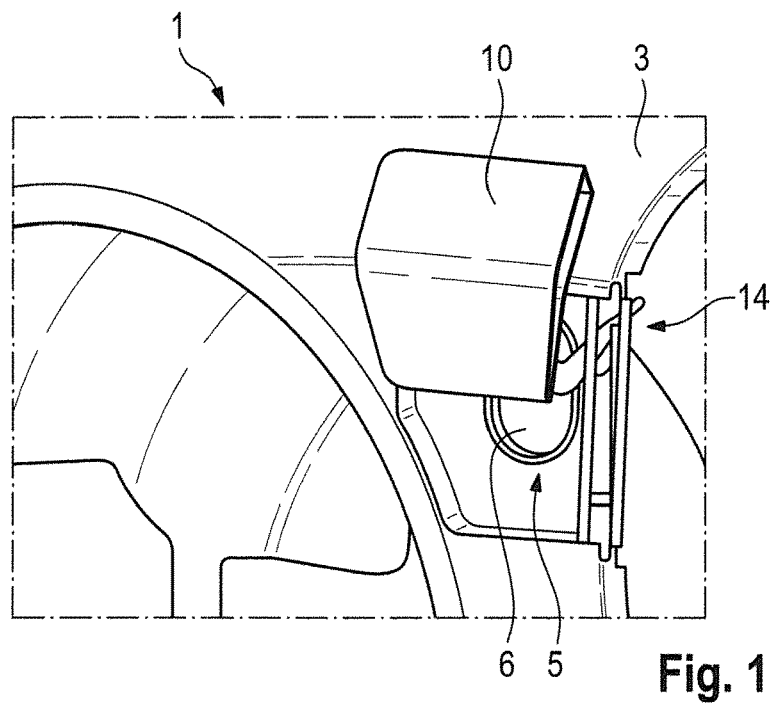
FIG. 1 is a perspective view of a front wing of an electric vehicle having a charging opening that can be closed by way of a charging flap.

FIG. 1 shows a front wing 3 of an electric vehicle 1 in a simplified manner. The electric vehicle 1 comprises a charging unit 5 with a charging opening 6.

The charging unit 5 of the electric vehicle 1 is assigned to an electric energy storage device of the electric vehicle 1. A charging plug element (not shown) can be plugged into the charging opening 6 to electrically charge the electric energy storage device in the electric vehicle 1.

The charging opening 6 of the charging unit 5 can be closed by way of a charging flap 10 which is articulated on a support structure of the electric vehicle 1 by way of a four-bar linkage arrangement 14.

Figure 2:
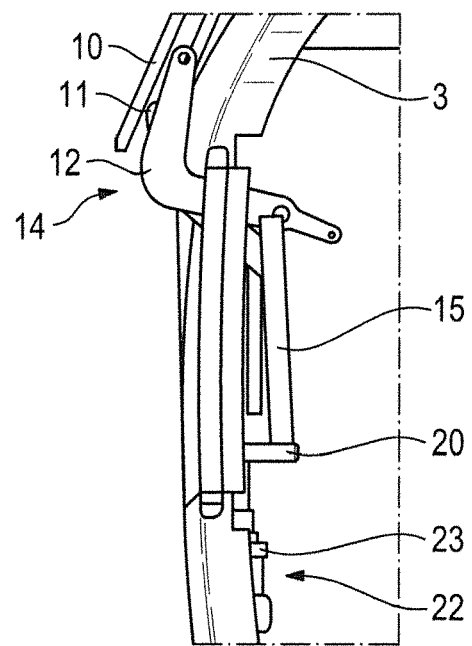
FIG. 2 is a cross-sectional view of the charging opening having the charging flap from FIG. 1.

As shown in FIG. 2, the four-bar linkage arrangement 14 comprises links 11, 12 and a spring device 15. Moreover, the four-bar linkage arrangement 14 is combined with a push-push element 20. The push-push element 20, in turn, is assigned a locking device 22 with an actuator 23.

The push-push element 20 can be blocked by the actuator 23 of the locking device 22. The push-push element 20 advantageously makes a slight opening of the charging flap 10 possible, approximately by a fingerbreadth. The slight opening of the charging flap 10 is brought about by the exertion of pressure, for example using the finger or the hand, on the push-push element 20 by way of the charging flap 10.

Figure 3C:
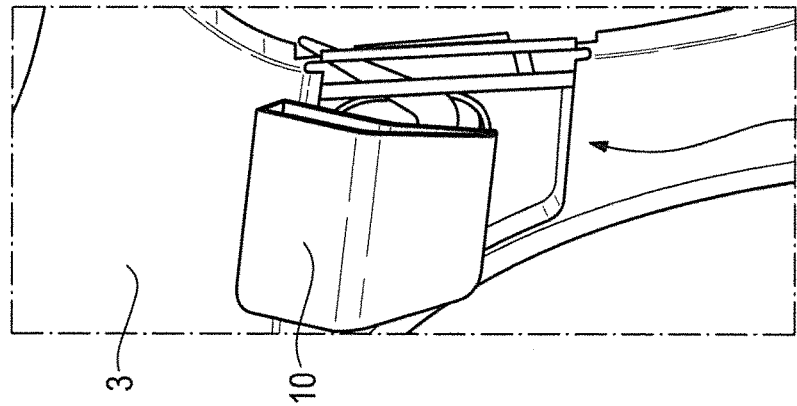
FIGS. 3A to 3F show a sequence of a movement of the charging flap between an open position and a closed position.
Figure 3B:
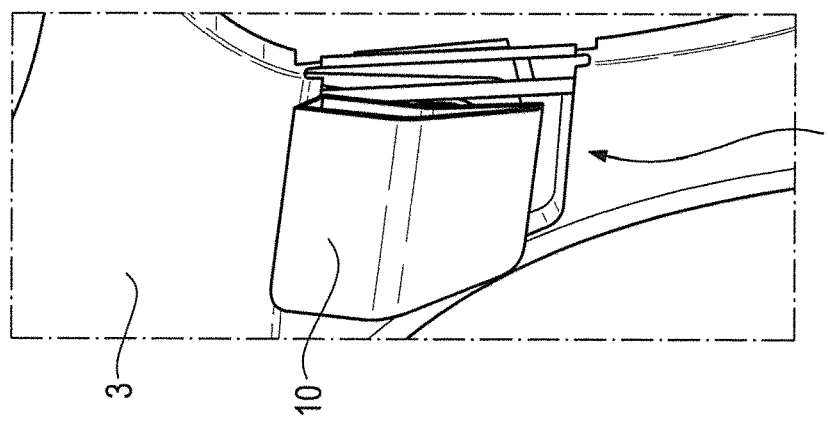
Figure 3A:
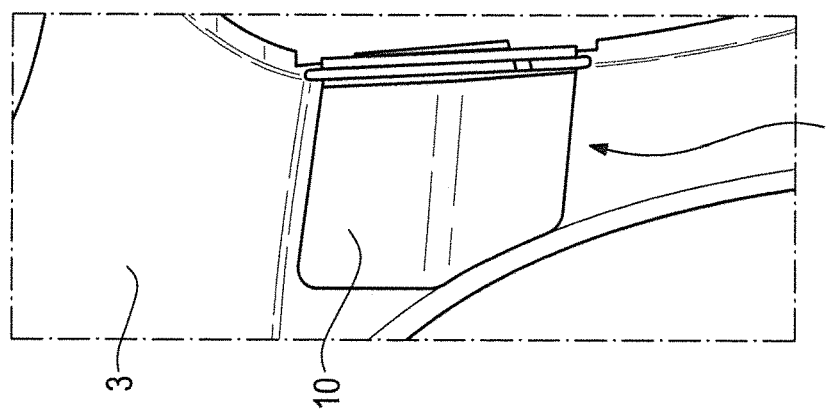
Figure 3F:
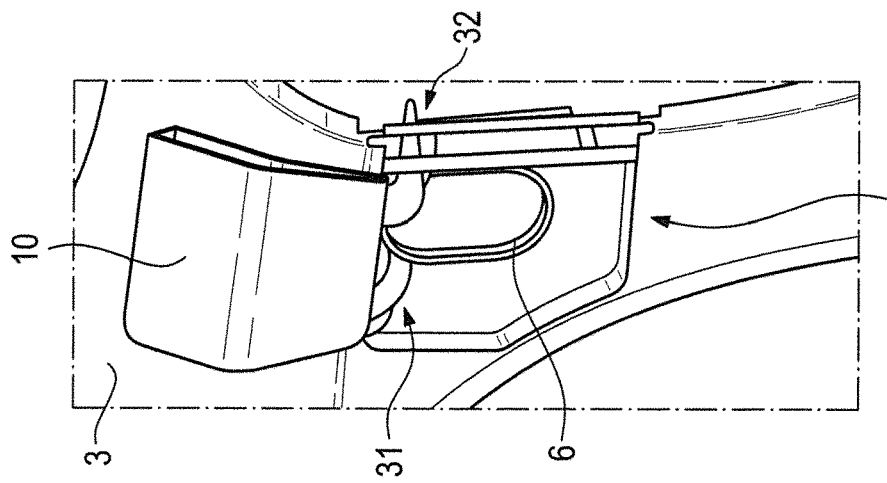

FIGS. 3A to 3F show a movement of the charging flap 10 between its closed position in FIG. 3A and its open position in FIG. 3F. In the closed position, the charging flap 10 completely closes the charging opening arranged underneath it in the wing 3.

Figure 3E:
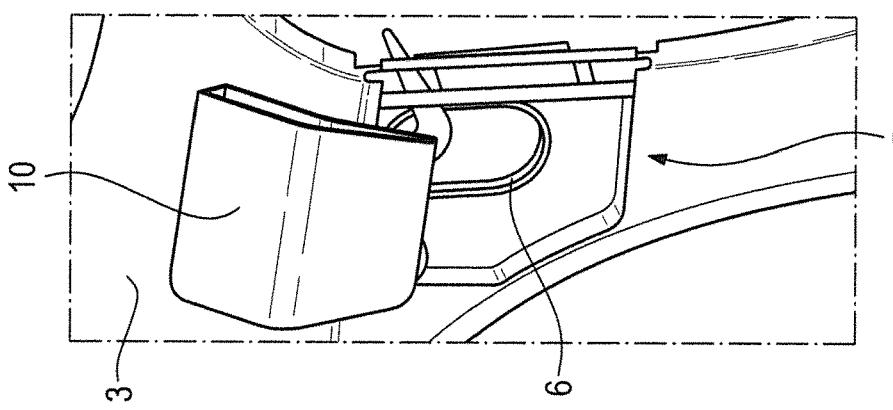
Figure 3D:
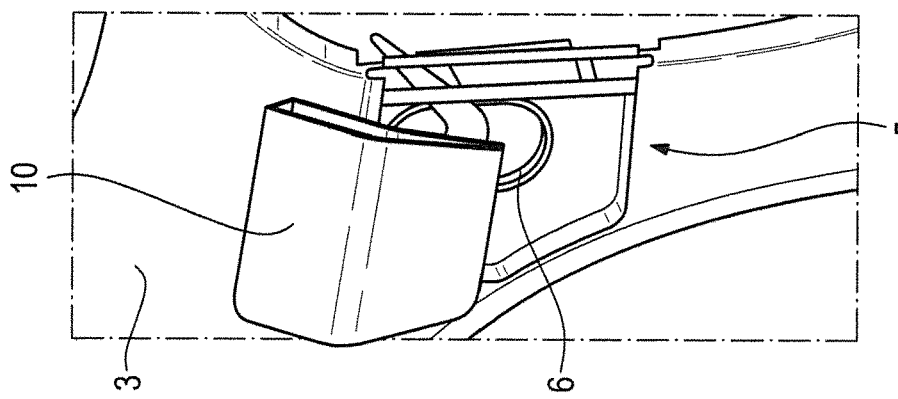

In FIG. 3B, the charging flap 10 is opened slightly by way of the actuation of the push-push element. In FIG. 3C to 3E, the charging opening 6 is opened increasingly by further opening of the charging flap 10, until the charging opening 6 finally is released completely in the open position of the charging flap 10.

In the open position, the charging flap 10 is arranged above the charging opening 6 on the wing 3, as can be seen in FIG. 3F. Here, the charging flap 10 still is spaced apart slightly from the wing 3. The arrangement of the charging flap 10 above the charging opening 6 in its open position enables the suitable charging plug to be plugged into the charging opening 6 in a simple way.

FIGS. 4A-5E illustrate the opening and the closing of the charging flap 10. It can be seen in these figures that the four-bar linkage arrangement 14 comprises two link pairs 31, 32 with each link pair having two links to produce a four-bar linkage. The charging flap 10 is held in a particularly stable manner on the support structure of the front wing 3 by way of the two link pairs 31, 32.

Figure 4C:
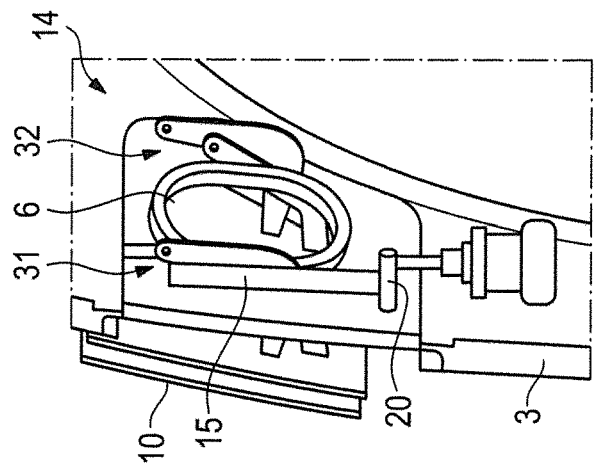
FIGS. 4A to 4E illustrate the opening of the charging flap.
Figure 4B:
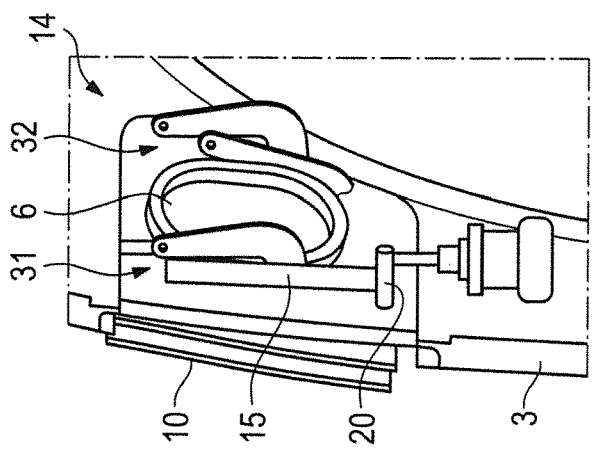
Figure 4A:
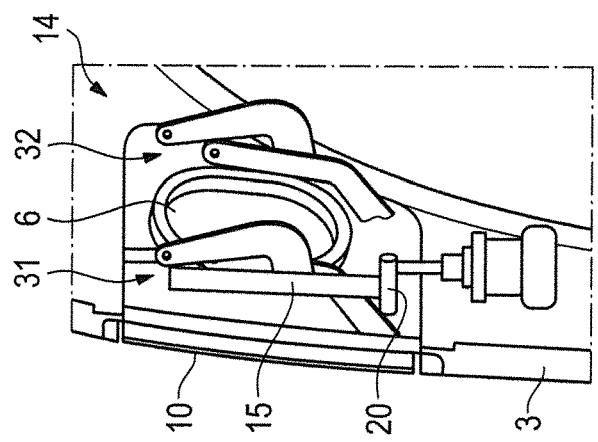

FIG. 4A shows the charging flap 10 in its closed position. The charging flap 10 is opened by a fingerbreadth by way of the push-push element 20 counter to the spring force of the spring device 15, by way of a pressure pulse on the push-push element 20, which pressure pulse preferably is exerted manually on the charging flap 10.

FIG. 4B shows the charging flap 10 in its dead center position, which is defined by a spring dead center of the spring device 15. From its dead center position shown in FIG. 4B, the charging flap 10 is opened further counter to the spring force of the spring device 15, until the reversal point of the spring device 15 is overcome.

Figure 4E:
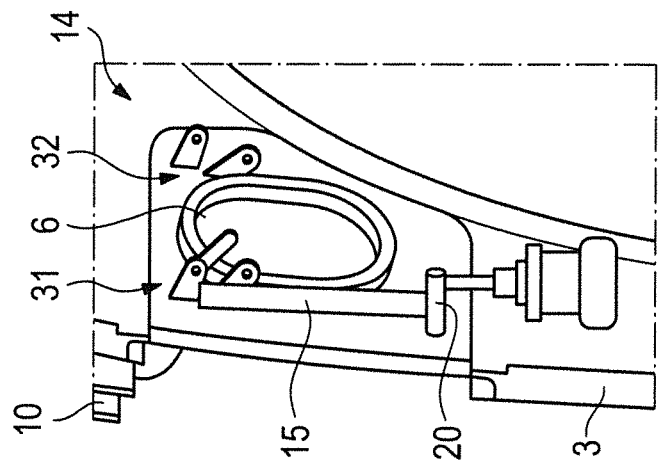
Figure 4D:
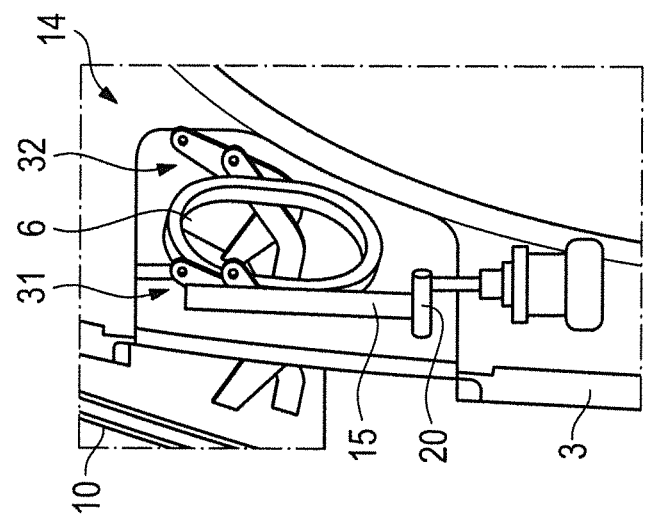

FIGS. 4C and 4D illustrate that, after the reversal point of the spring device 15 is overcome, the charging flap 10 opens automatically by the spring force of the spring device 15, until the open position of the charging flap 10 in FIG. 4E is reached.

Figure 5C:
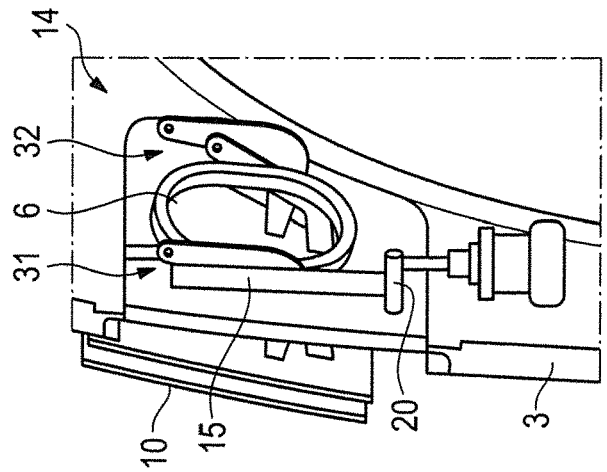
FIGS. 5A to 5E illustrate the closing of the charging flap.
Figure 5B:
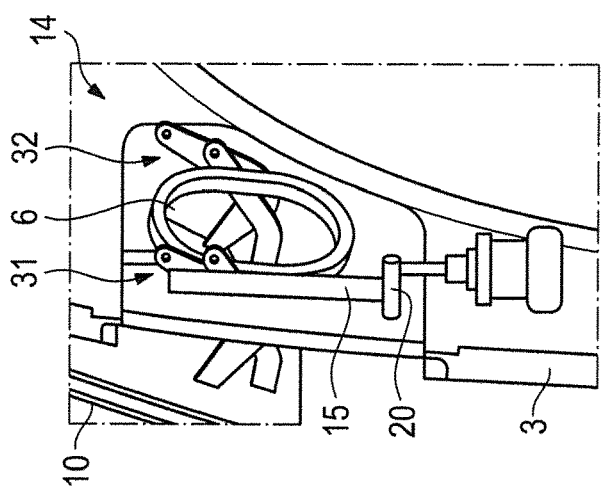
Figure 5A:
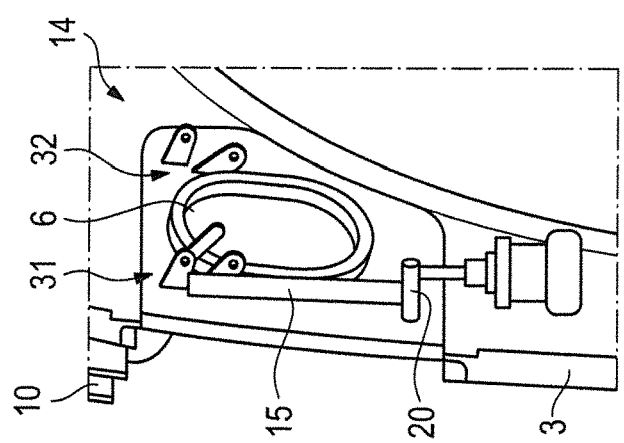

FIG. 5A shows the charging flap 10 in its open position. During closing, the charging flap 10 first is moved manually by pressing the charging flap 10 down counter to the spring force of the spring device 15 as far as beyond the reversal point of the latter. After the reversal point is overcome, the charging flap 10 then closes automatically.

Figure 5E:
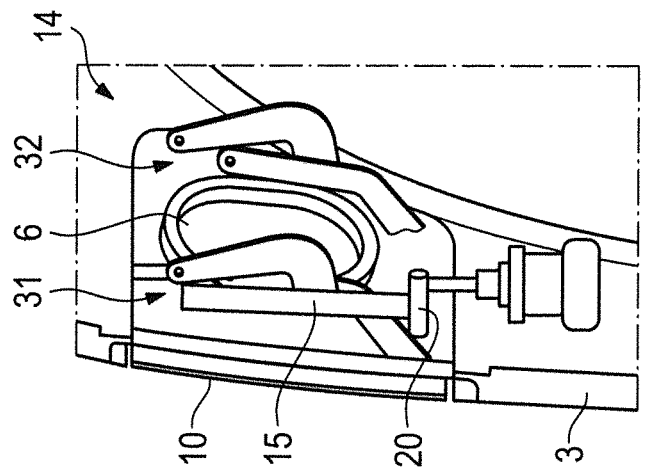
Figure 5D:
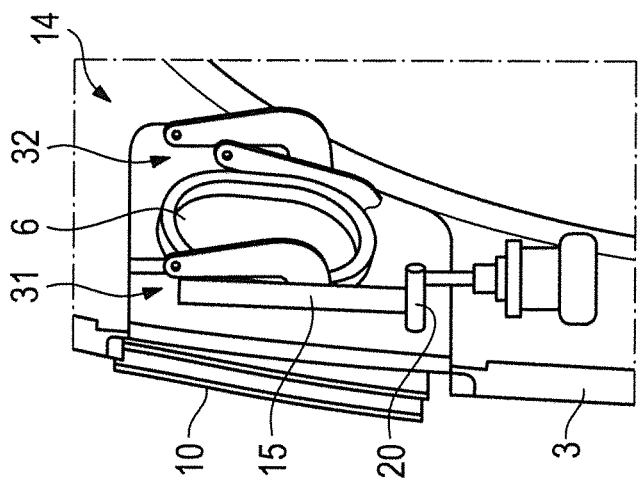

In FIG. 5B, the charging flap 10 is closed approximately half. In FIG. 5C, the charging flap 10 is closed approximately 70%. FIG. 5D corresponds to the dead center position of the charging flap 10, which is defined by the spring dead center of the spring device 15. FIG. 5E shows the charging flap 10 completely closed.

What is claimed is:
1. A mechanism for actuating a charging flap (10), in particular of an electric vehicle (1), which charging flap (10) is articulated on a support structure by way of a four-bar linkage arrangement (14) in such a way that the charging flap (10) can be moved between a closed position (FIG. 3A) and an open position (FIG. 3F), characterized in that the mechanism for actuating the charging flap (10) comprises a push-push element (20) which is combined with a spring device (15) which is assigned to the four-bar linkage arrangement (14).

2. The mechanism as claimed in claim 1, characterized in that the charging flap (10) is prestressed into its closed position (FIG. 3A) and its open position (FIG. 3F) by way of the spring device (15).

3. The mechanism as claimed in either of the preceding claims, characterized in that the spring device (14) has a spring dead center which is assigned a dead center position (FIG. 4B, FIG. 5D) of the charging flap (10), in which dead center position the charging flap (10) is arranged between its closed position (FIG. 3A) and its open position (FIG. 3F).

4. The mechanism as claimed in one of the preceding claims, characterized in that the charging flap (10) can be pivoted upward out of its closed position (FIG. 3A) into its open position (FIG. 3F).

5. The mechanism as claimed in one of the preceding claims, characterized in that, in its open position (FIG. 3F), the charging flap (10) is arranged above a charging opening (6).

6. The mechanism as claimed in one of the preceding claims, characterized in that the four-bar linkage arrangement (15) comprises two link pairs (31, 32) which are articulated on two sides of the charging flap (10).

\* \* \* \* \*